US007448402B2

(12) United States Patent
Martrich et al.

(10) Patent No.: US 7,448,402 B2
(45) Date of Patent: Nov. 11, 2008

(54) LEAK CONTAINMENT APPARATUS FOR REACTIVE GASES

(75) Inventors: Robert Lee Martrich, Emmaus, PA (US); Gordon Leon Whitesell, Pottsville, PA (US); Eugene Yin Ngai, Whitehouse, NJ (US); James Francis DeiTos, Emmaus, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 23 days.

(21) Appl. No.: 11/590,029

(22) Filed: Oct. 31, 2006

(65) Prior Publication Data

US 2008/0099075 A1 May 1, 2008

(51) Int. Cl.
*F16K 35/00* (2006.01)
*F16J 13/02* (2006.01)
*F17C 13/06* (2006.01)

(52) U.S. Cl. .................... 137/15.11; 137/312; 137/382; 220/724; 73/49.2; 73/49.3

(58) Field of Classification Search ................. 137/312, 137/377, 382, 15.11; 220/724, 725, 728, 220/323, 324, 326; 73/49.2, 49.3, 46
See application file for complete search history.

(56) References Cited

U.S. PATENT DOCUMENTS 4,241,846 A * 12/1980 Murphy ...................... 220/318
4,489,679 A * 12/1984 Holt ........................ 122/451 S
5,086,804 A 2/1992 Ngai
5,158,204 A * 10/1992 Martrich et al. ............. 220/727
5,482,536 A 1/1996 Ngai et al.
5,588,461 A * 12/1996 Plecnik ....................... 137/312
5,636,666 A * 6/1997 Mattern ....................... 141/51
6,003,540 A * 12/1999 Bruni et al. ................. 137/312
6,139,806 A * 10/2000 Nickens et al. .............. 422/168

* cited by examiner

*Primary Examiner*—Kevin L Lee
(74) *Attorney, Agent, or Firm*—Lina Yang

(57) ABSTRACT

Fluid storage and leak containment comprising (a) a fluid storage vessel comprising at least one vessel having an interior, an exterior, and an outlet opening between the interior and the exterior; (b) a fluid flow fitting sealably connected to the outlet opening and adjacent the exterior of the at least one vessel, wherein the fluid flow fitting is adapted for withdrawing reactive gas from the interior of the vessel; and (c) a containment enclosure having an interior, an exterior, an open end, and an extraction port adapted for the withdrawal of gas from the interior of the containment enclosure, wherein the open end is adapted to fit over and around the fluid flow fitting such that the containment enclosure surrounds the fluid flow fitting and is adapted to collect any reactive gas leaking from the fluid flow fitting.

22 Claims, 7 Drawing Sheets

LEAK CONTAINMENT APPARATUS FOR REACTIVE GASES

BACKGROUND OF THE INVENTION

Reactive gases are used in many process steps in the fabrication of microelectronic components, optical components, analytical instruments, and other specialized equipment. Most of these reactive gases are highly hazardous to operating personnel, and the manufacture, storage, transportation, and end use of these gases must be carried out under strict safety procedures. These gases are transported and stored at ambient temperatures in pressurized cylinders either as compressed gases or as pressurized saturated liquids. The pressurized cylinders may be individual standalone cylinders or may be multiple-tube bundles used in tube trailers or ISO containers.

Each storage cylinder is fabricated with at least one discharge port, and the port typically is threaded for the installation of fluid flow fittings such as shutoff valves, bull plugs, and other fittings that are connected in turn to valve and piping s that supply gas to an end user. Leaks may occur in a fluid flow fitting at threaded connections, compression fittings, O-ring seals, valve stem packings, and valve seats. In many cases, these leaks are small (e.g., less than about 50 sccm), but even small leaks can be hazardous and may develop into larger and possibly catastrophic leaks. If leaks occur at an operating plant in which the cylinders are filled, appropriate safety equipment and procedures will be available to contain the leak and repair the leaking components. If leaks occur during cylinder transportation or while a cylinder is stored at a user's site, however, appropriate equipment and procedures to contain the leak and repair the leaking components may not be available.

There is a need in the art for methods of containing such leaks during cylinder transportation and storage in the time period between initial leak detection and the return of the leaking cylinder to a properly-equipped repair facility. This need is addressed by the embodiments of the invention described below and defined by the claims that follow.

BRIEF SUMMARY OF THE INVENTION

One embodiment of the invention provides a fluid storage and leak containment apparatus comprising (a) a fluid storage vessel assembly comprising at least one vessel having an interior, an exterior, and an outlet opening between the interior and the exterior; (b) a fluid flow fitting sealably connected to the outlet opening and adjacent the exterior of the at least one vessel, wherein the fluid flow fitting is adapted for withdrawing reactive gas from the interior of the vessel; and (c) a containment enclosure having an interior, an exterior, an open end, and an extraction port adapted for the withdrawal of gas from the interior of the containment enclosure, wherein the open end is adapted to fit over and around the fluid flow fitting such that the containment enclosure surrounds the fluid flow fitting and is adapted to collect any reactive gas leaking from the fluid flow fitting.

Another embodiment of the invention is a leak containment cap comprising an enclosure having an interior, an exterior, an open end, and an extraction port adapted for the withdrawal of gas from the interior of the enclosure, wherein the open end is adapted to fit over and around a fluid flow fitting that is connected to an outlet of a fluid storage vessel of a fluid storage vessel assembly, and wherein the enclosure is adapted to surround the fluid flow fitting and contact the fluid storage vessel assembly; and a removable attachment member connected to the containment enclosure, wherein the removable attachment member is adapted to removably attach the containment enclosure to the fluid storage vessel assembly and to press the open end of the enclosure against the fluid storage vessel assembly around the fluid flow fitting.

A related embodiment is a method for containing a leak of a reactive gas from a fluid storage vessel assembly comprising (a) providing a fluid storage vessel and leak containment apparatus including
 (1) a fluid storage vessel assembly including at least one fluid storage vessel having an interior, an exterior, and an outlet opening between the interior and the exterior;
 (2) a fluid flow fitting sealably connected to the outlet opening and adjacent the exterior of the at least one fluid storage vessel, wherein the fluid flow fitting is adapted for withdrawing reactive gas from the interior of the vessel; and
 (3) a leak containment cap comprising (i) an enclosure having an interior, an exterior, an open end, and an extraction port adapted for the withdrawal of gas from the interior of the leak containment cap, wherein the open end is adapted to fit over and around a fluid flow fitting connected to an outlet of the at least one fluid storage vessel such that the enclosure can surround the fluid flow fitting and contact the fluid storage vessel assembly, and (ii) a removable attachment member connected to the enclosure, wherein the removable attachment member is adapted to removably attach the enclosure to the fluid storage vessel assembly and to press the open end of the enclosure against the fluid storage vessel assembly around the fluid flow fitting;
(b) detecting a leak of the reactive gas from the fluid flow fitting;
(c) placing the enclosure over and around the fluid flow fitting and attaching the removable attachment member to the fluid storage vessel assembly so that the enclosure completely surrounds the fluid flow fitting; and
(d) collecting in the enclosure reactive gas leaking from the fluid flow fitting, withdrawing through the extraction port the reactive gas collected in the enclosure, and reacting the reactive gas with reactive material, thereby capturing and immobilizing the reactive gas leaking from the fluid flow fitting.

Another related embodiment of the invention includes a fluid storage and leak containment apparatus comprising (a) a fluid storage vessel assembly comprising a plurality of fluid storage vessels, each fluid storage vessel having an interior, an exterior, an outlet opening between the interior and the exterior, and a fluid flow fitting sealably connected to the outlet opening and adjacent the exterior of the fluid storage vessel, wherein the fluid flow fitting is adapted for withdrawing a reactive gas from the interior of the vessel;
(b) a leak containment cap comprising (i) an enclosure having an interior, an exterior, an open end, and an extraction port adapted for the withdrawal of gas from the interior of the enclosure, wherein the open end is adapted to fit over and around a fluid flow fitting connected to an outlet of the fluid storage vessel such that the enclosure can surround the fluid flow fitting and contact the fluid storage vessel assembly, and (ii) a removable attachment member connected to the enclosure, wherein the removable attachment member is adapted to removably attach the enclosure to the fluid storage vessel assembly and to press the open end of the enclosure against the fluid storage vessel assembly around the fluid flow fitting;

(c) a scrubbing vessel having an inlet in flow communication with the extraction port and an outlet, wherein the scrubbing vessel contains reactive material adapted to react with and capture the reactive gas withdrawn from the leak containment cap; and (d) a venturi eductor having a pressurized gas inlet, an aspirated inlet, and an outlet, wherein the aspirated inlet is in flow communication with the scrubbing vessel.

A final embodiment of the invention provides a method for responding to a leak of a reactive gas from a pressurized storage vessel assembly comprising (a) providing a fluid storage and leak containment apparatus including (1) a fluid storage vessel assembly comprising at least one fluid storage vessel having an interior, an exterior, and an outlet opening between the interior and the exterior;

(2) a fluid flow fitting sealably connected to the outlet opening and adjacent the exterior of the at least one fluid storage vessel, wherein the fluid flow fitting is adapted for withdrawing reactive gas from the interior of the vessel; and (3) a leak containment cap comprising (i) an enclosure having an interior, an exterior, an open end, and an extraction port adapted for the withdrawal of gas from the interior of the enclosure, wherein the open end is adapted to fit over and around a fluid flow fitting connected to an outlet of the at least one fluid storage vessel such that the enclosure can surround the fluid flow fitting and contact the exterior of the fluid storage vessel assembly, and (ii) a removable attachment member connected to the enclosure, wherein the removable attachment member is adapted to removably attach the enclosure to the fluid storage vessel assembly and to press the open end of the enclosure against the fluid storage vessel assembly around the fluid flow fitting;

(b) detecting a leak of the reactive gas from the fluid flow fitting;

(c) placing the enclosure over and around the fluid flow fitting and attaching the removable attachment member so that the enclosure surrounds the fluid flow fitting, and collecting in the enclosure the reactive gas leaking from the fluid flow fitting;

(d) withdrawing through the extraction port a mixture of the reactive gas collected in the enclosure and ambient air drawn into the enclosure, and reacting the reactive gas with reactive material, thereby capturing and immobilizing the reactive gas leaking from the fluid flow fitting;

(e) while continuing to capture and immobilize the reactive gas from the fluid storage vessel, transporting the fluid storage vessel assembly to a repair facility; and (f) removing the reactive gas from the fluid storage vessel and replacing or repairing the fluid flow fitting.

DETAILED DESCRIPTION OF THE INVENTION

Figure 1:
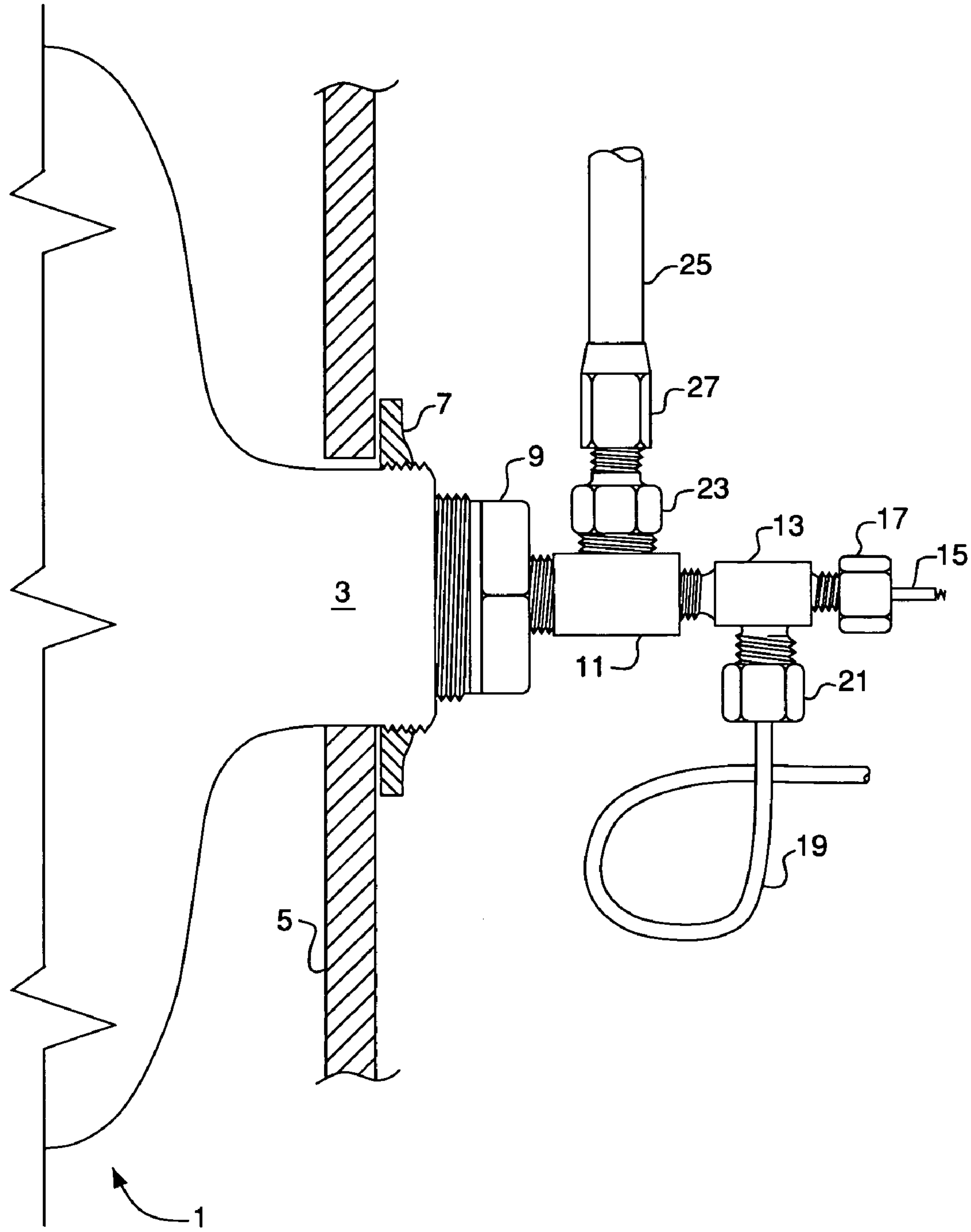
FIG. 1 PRIOR ART
FIG. 1 is a schematic view of a typical fluid flow fitting for the withdrawal of gas from a cylinder that is part of a multiple-cylinder fluid storage vessel.

The embodiments of the present invention provide methods and apparatuses for collecting and capturing reactive gas that escapes from a leaking fluid storage vessel assembly. The collection assembly may be operated to capture the leaking reactive gas until the fluid storage vessel assembly can be repaired by withdrawing the reactive gas from the storage vessel assembly and replacing the leaking components. In one embodiment, the collection may be operated during transportation of the fluid storage vessel assembly to a repair facility.

The collection assembly may be carried in the inventory of an emergency response vehicle for immediate delivery to a leak site to capture gas leaking from a fluid storage vessel assembly. The collection assembly also may be carried on a truck or a cab/trailer of a mobile fluid storage vessel assembly so that the collection is available for immediate use if a leak occurs. The fluid storage vessel assembly may be, for example, a plurality of horizontal cylinders assembled in a tube trailer, a plurality of horizontal cylinders assembled as an ISO container transportable by flatbed trailer, or individual cylinders carried on a truck or cab/trailer.

Reactive gases are stored in pressurized cylinders at ambient temperatures either as compressed gases or as pressurized saturated liquids. The pressurized cylinders may be individual standalone cylinders or may be bundles of horizontal cylinders assembled in tube trailers or in ISO containers as described above. Pressurized fluid storage cylinders are fabricated with at least one discharge port, and the port typically is threaded internally for the installation of fluid flow fittings that comprise bull plugs, shutoff valves, connections to piping leading to safety relief devices, and connections to end user gas delivery piping. Leaks may occur in a fluid flow fitting at threaded, O-ring, flared, or ferrule-type connections between the fluid flow fitting and valves or external piping s, at a valve stem packing, or across a valve seat.

The term "fluid storage vessel assembly" is defined as a assembly comprising one or more fluid storage vessels or cylinders designed for the storage of pressurized fluids including compressed gases and pressurized liquids. Fluid storage vessel assemblies include single standalone cylinders, multiple cylinders grouped and assembled for mounting on trucks or trailers, and multiple cylinders grouped and assembled in a framework as shippable ISO containers. A fluid storage vessel assembly thus includes any cylinder or group of cylinders containing compressed gas or pressurized liquid, wherein each cylinder includes an associated fluid flow fitting.

A fluid flow fitting is a device connected to an outlet of a fluid storage vessel through which gas flows during withdrawal from the vessel. The fluid flow fitting includes one or more parts including but not limited to bull plugs, tees, connectors, O-ring seals, pipe thread joints, compression fittings, piping segments, and shutoff valves.

The term “reactive gas” is defined as any gas that reacts with liquids, solids, or other gases to form reaction products accompanied by the generation of heat. The term “reactive material” is defined as any liquid and/or solid material that reacts with a reactive gas to form reaction products, thereby capturing and immobilizing the reactive gas. The reactive material may undergo a chemical reaction with the reactive gas and/or adsorb the reactive gas.

The term “removably attached” refers to a removable attachment member connected to a containment enclosure as described below wherein the removable attachment member is adapted to be attached to and detached from a fluid storage vessel assembly. The attachment member may be removably connected to the containment enclosure or may be permanently connected to the containment enclosure. The term “removably attach” means the act of attaching and/or detaching a removable attachment member to a fluid storage vessel assembly.

The term “in flow communication with” as applied to a first and second region means that gas can flow from the first region to the second region through connecting piping and/or an intermediate region.

A repair facility is defined as a facility equipped and manned for the safe handling, processing, and repairing of a fluid storage vessel assembly that is leaking a reactive gas.

The indefinite articles “a” and “an” as used herein mean one or more when applied to any feature in embodiments of the present invention described in the specification and claims. The use of “a” and “an” does not limit the meaning to a single feature unless such a limit is specifically stated. The definite article “the” preceding singular or plural nouns or noun phrases denotes a particular specified feature or particular specified features and may have a singular or plural connotation depending upon the context in which it is used. The adjective “any” means one, some, or all indiscriminately of whatever quantity. The term “and/or” placed between a first entity and a second entity means one of (1) the first entity, (2) the second entity, and (3) the first entity and the second entity.

A typical fluid flow fitting for a multiple-vessel fluid storage assembly such as a tube trailer is illustrated in FIG. 1. Cylinder 1 has neck portion 3 supported in a circular opening in bulkhead 5 such that the bulkhead supports the vertical component of the cylinder weight and the cylinder is free to rotate slightly in the circular opening when the cylinder twists about its axis due to torsional forces. Neck 3 is threaded on the outer surface, and retaining collar 7 is threaded over the neck to locate and retain the cylinder in the axial direction. Cylinder 1 typically is supported at the other end in a similar support bulkhead, and the entire cylinder assembly is mounted on a truck or trailer by methods known in the art. Alternatively, cylinder 1 may be one of a plurality of cylinders grouped in a similar manner and mounted in an ISO-type container framework.

Neck 3 is internally threaded to receive externally-threaded bull plug 9, which has a center internally-threaded opening to receive an externally-threaded end of tee fitting 11. The seal between bull plug 9 and neck 3 is provided by an O-ring (not shown). Tee fitting 11 has an internally-threaded opening at the other end to receive an externally-threaded end of shutoff valve 13, and the valve is equipped with valve stem 15 mounted in valve packing section 17. Pigtail 19, which is connected to the outlet of valve 13 by compression fitting 21, supplies gas to a supply manifold (not shown) that is connected in turn to an end user’s gas supply. Tee fitting 11 also has an internally-threaded opening on the top section to receive one end of externally-threaded compression fitting body 23. Tube 25 is connected by compression fitting 27 at the other end of compression fitting body 23 and leads to a safety relief device (not shown). In some s, a safety relief device is not used, and tee fitting 11, externally-threaded compression fitting body 23, tube 25, and compression fitting 27 are not required.

The fluid flow fitting of FIG. 1 may leak at any of the threaded and compression fittings shown or at the stem packing of shutoff valve 13. It has been observed in the development of the embodiments described below that leaks occur most often at the O-ring seal between cylinder neck 3 and bull plug 9. When such a leak occurs, replacement of the O-ring and possibly the bull plug is required, and the pressurized fluid in cylinder 1 must be withdrawn before this replacement can be effected. When leaks occur at the threaded or compression fitting connections on tee 11 as described above, cylinder 1 also must be emptied before replacement or repair of the leaking components can be effected. These repairs usually must be carried out in a central cylinder fill and maintenance facility. Most leaks, however, will occur at locations away from such a facility, and these leaks are problematic when the stored gas is hazardous and reactive. The embodiments of the invention described below provide methods to contain these leaks while the fluid vessel storage assembly is transported to a facility having the equipment to handle the leak or until an emergency response (ER) team can provide onsite disposal of the product fluid withdrawn from the leaking cylinder.

Figure 2:
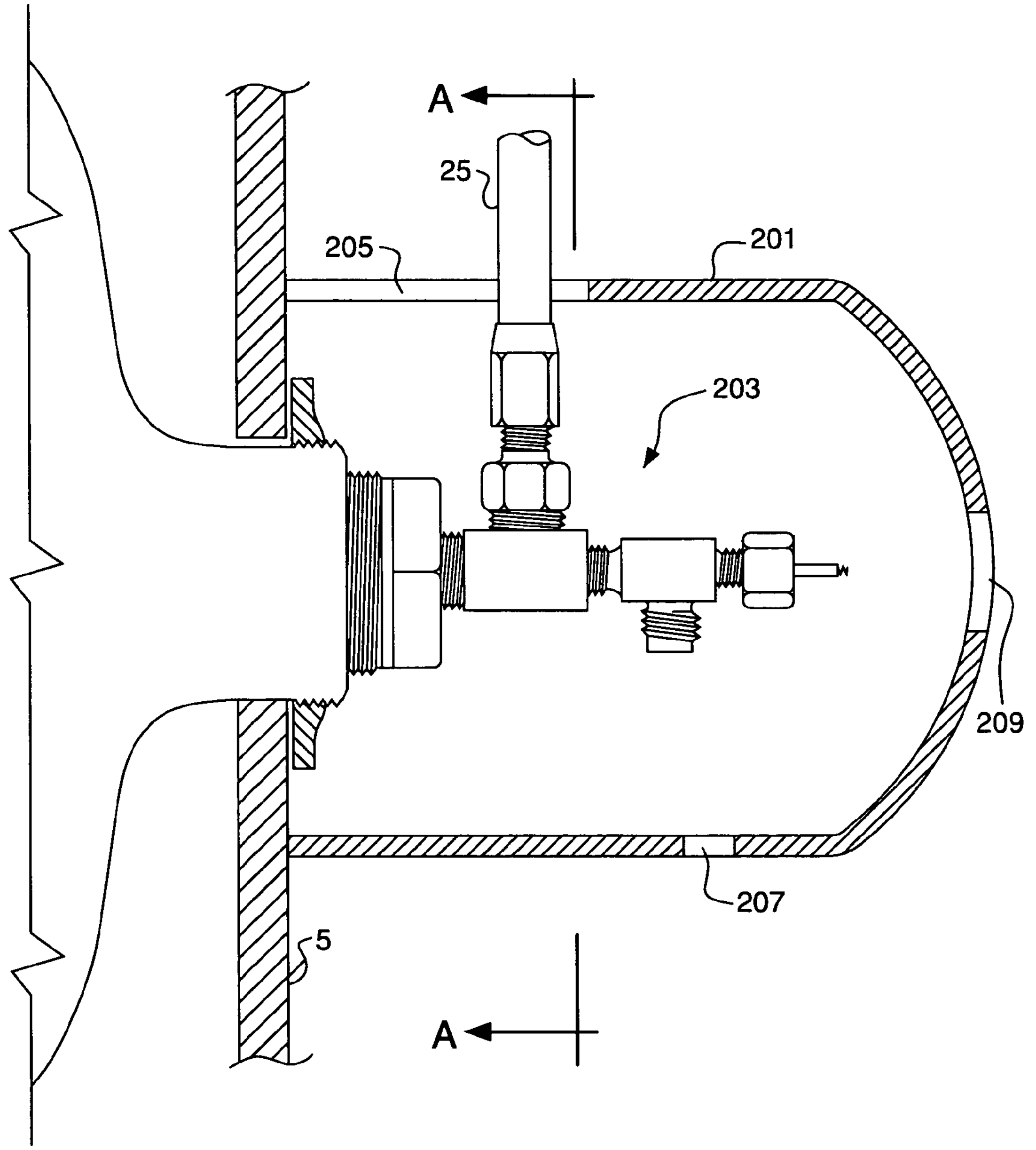
FIG. 2 is a schematic view of a containment enclosure shown in cross section placed over and around the fluid flow fitting according to an embodiment of the invention.

Embodiments of the invention include a containment enclosure that fits over and around the fluid flow fitting such that the containment enclosure surrounds the fluid flow fitting and is adapted to collect any reactive gas leaking from the fluid flow fitting. A typical containment enclosure is illustrated in FIG. 2 wherein containment enclosure 201 fits over and around fluid flow fitting 203 and is placed in contact with bulkhead 5. In this example, pigtail 19 and fitting 21 of FIG. 1 are removed before placement of containment enclosure 201. Slot 205 is provided in the wall of containment enclosure 201 so that the enclosure can be slipped over tube 25. As described later, this slot can be closed off (but typically not sealed) by appropriate methods using adhesive tape or a fabric with a hook-and-loop closure. At least one extraction port is provided for the withdrawal of collected leaking gas from the interior of the containment enclosure. In the embodiment of FIG. 2, two ports are provided—small port 207 for withdrawing gas from smaller leaks and larger port 209 for withdrawing gas from larger leaks. The port not in use can be plugged as needed (not shown). The containment enclosure may be fabricated from any metal, plastic, or composite material that is compatible with the leaking gas.

A that does not require a safety relief device does not have tee fitting 11, externally-threaded compression fitting body 23, tube 25, and compression fitting 27. In this case, pigtail 19 is not removed and enclosure 201 can be placed over and around fluid flow fitting 203 such that slot 205 slides over pigtail 19. As described later, this slot can be closed off (but typically not sealed) by appropriate methods using adhesive tape or a fabric with a hook-and-loop closure.

Figure 3:
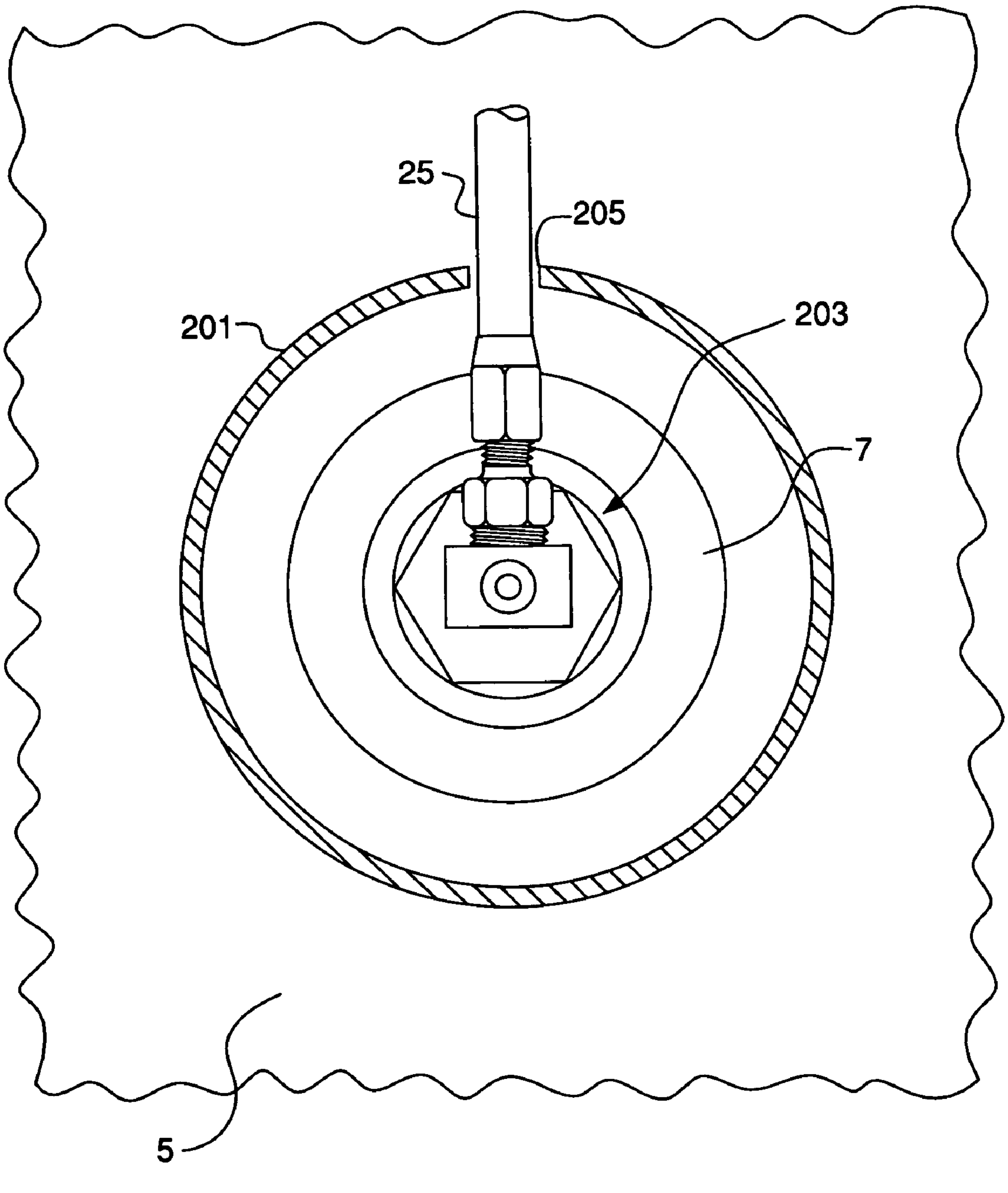
FIG. 3 is a view of section A-A of FIG. 2.

FIG. 3 is a view of section A-A of FIG. 2 showing containment enclosure 201 fitting over and around fluid flow fitting 203 in contact with bulkhead 5 outside of retaining collar 7. Slot 205 is shown in the wall of containment enclosure 201 allowing the enclosure to be slipped over tube 25.

Figure 4:
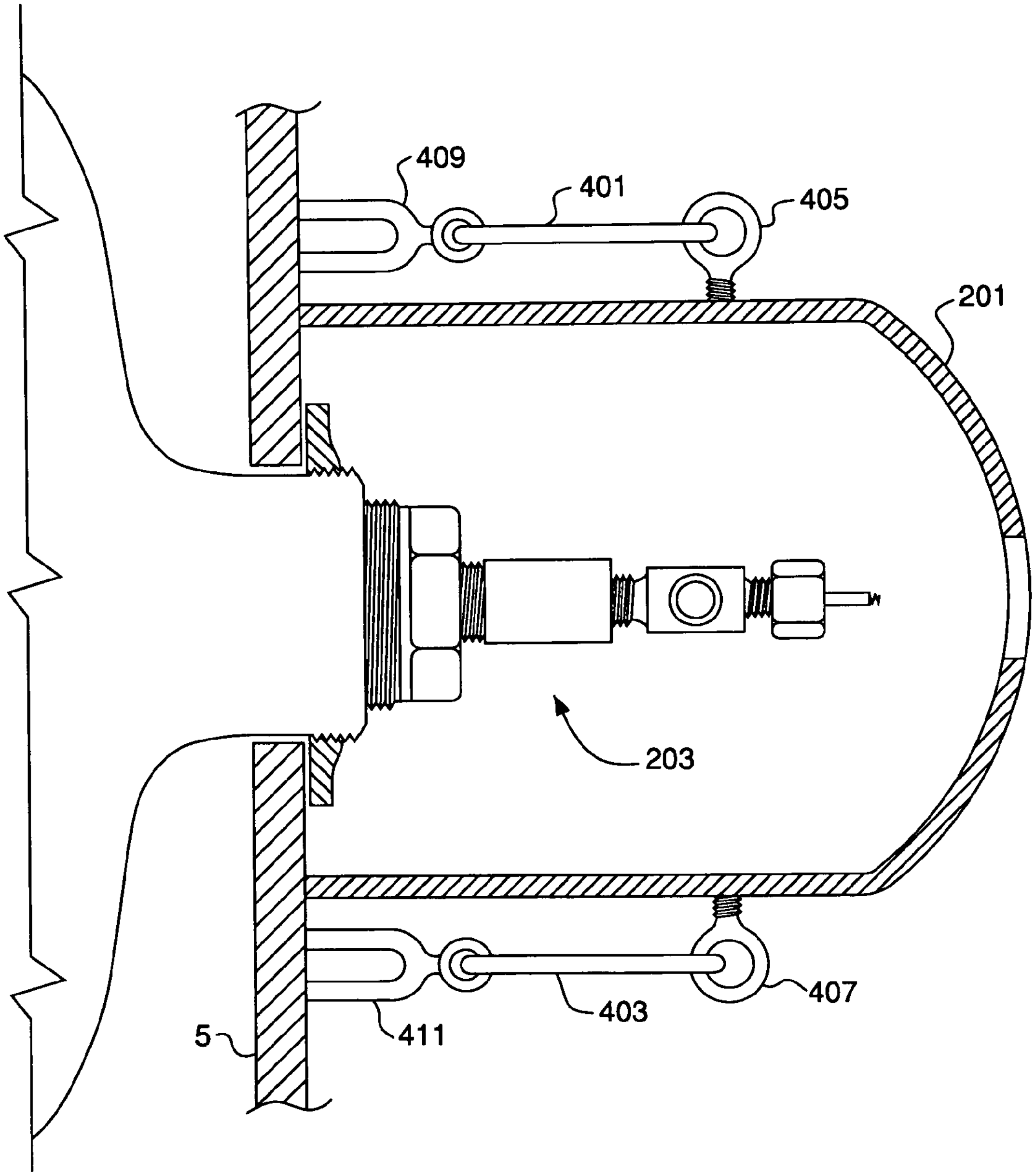
FIG. 4 is an alternative schematic view of the containment enclosure of FIG. 2 (shown in cross section) placed over and around the fluid flow fitting and attached to a part of the fluid storage vessel assembly according to an embodiment of the invention.

Containment enclosure 201 may be removably attached to the fluid storage vessel assembly around fluid flow fitting 203 when a leak occurs and detached for storage when the leak is repaired. The enclosure may be attached by any type of detachable connection assembly that is adapted to hold the enclosure in place around the fitting and against bulkhead 5. One type of detachable connection assembly is illustrated in the embodiment of FIG. 4, which is a bottom view orthogonal to the view of FIG. 2 showing containment enclosure 201 in section. In this embodiment, two elastic bodies or cords 401 and 403 are attached to containment enclosure 201 by eyebolts 405 and 407. The elastic cords are attached at the opposite ends to magnets 409 and 411 that are removably attached to bulkhead 5 (which typically is steel), thereby placing elastic cords in tension and forcing containment enclosure 201 against bulkhead 5. The elastic cords may be, for example, bungee cords or any other elastomeric material appropriate for the purpose of forcing containment enclosure 201 against bulkhead 5.

Alternatively, springs of appropriate length and diameter may be used instead of elastomeric cords. In another alternative, rope or webbing may be used in combination with tighten-and-release mechanisms. In an alternative to the use of magnets, eyebolts may be permanently attached to bulkhead 5 on either side of fluid flow fitting 203, and elastomeric cords or springs of appropriate length may be attached at one end to eyebolts 405 and 407 and provided with hooks at the other end for connection to the eyebolts on bulkhead 5. Other types of detachable connection assemblies can be envisioned to provide for the attachment and detachment of containment enclosure 201 to bulkhead 5.

Figure 5:
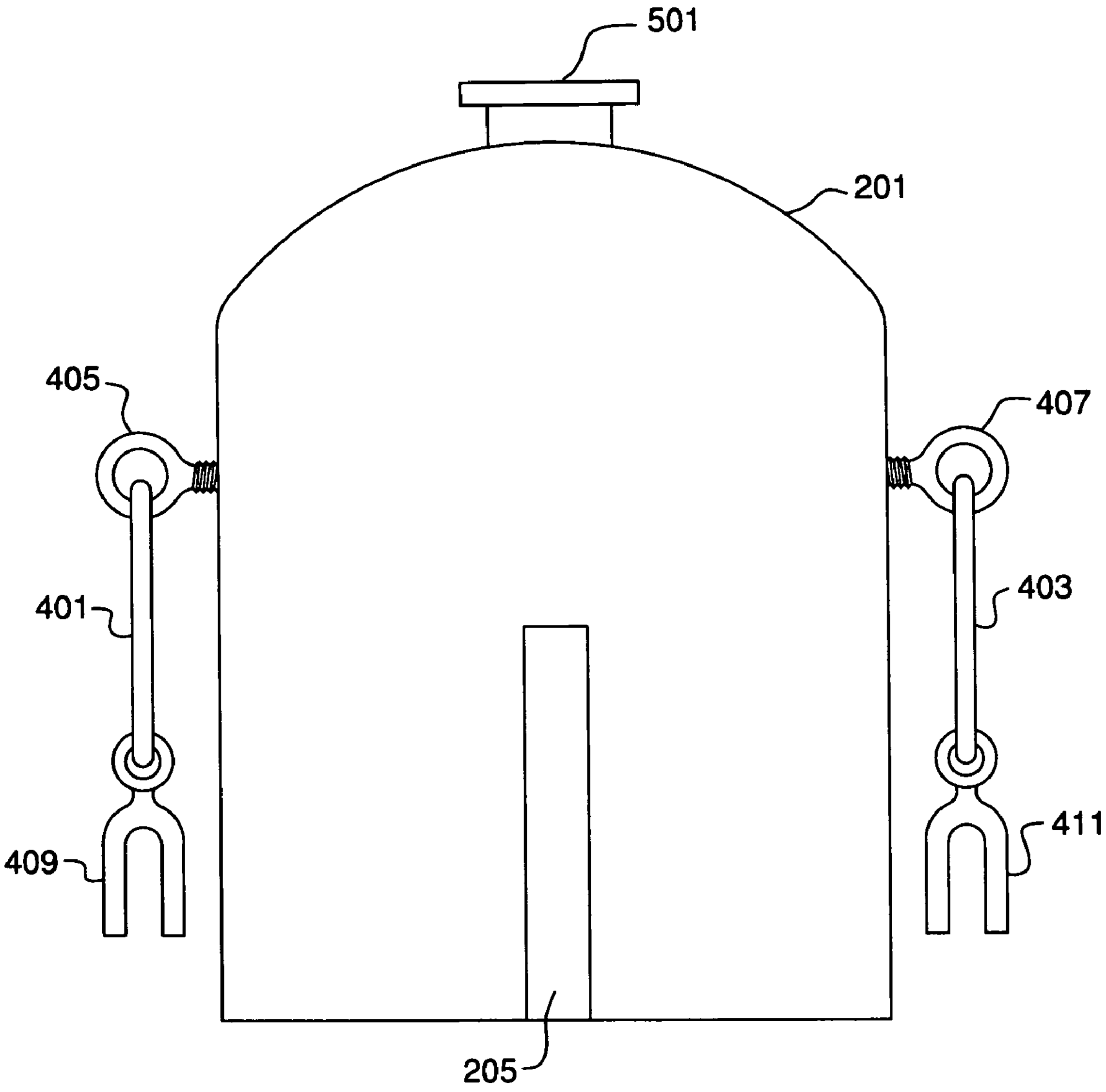
FIG. 5 is an external view of the containment enclosure of FIG. 4.

An external view of the embodiment of FIG. 4 is given in FIG. 5 showing containment enclosure 201, slot 205, elastic bodies or cords 401 and 403 (not in tension), eyebolts 405 and 407, and magnets 409 and 411. In this view, larger port 209 is closed off by cap 501. The combination of containment enclosure 201 with elastic bodies or cords 401 and 403, eyebolts 405 and 407, and magnets 409 and 411 may be defined as a type of leak containment cap.

A leak containment cap is defined generically as the combination of any containment enclosure adapted for leak containment as described above and any attachment member connected to the containment enclosure. The attachment member is adapted to removably attach the containment enclosure to a fluid storage vessel assembly and to press the open end of the enclosure against the fluid storage vessel assembly around the fluid flow fitting as described above.

Figure 6:
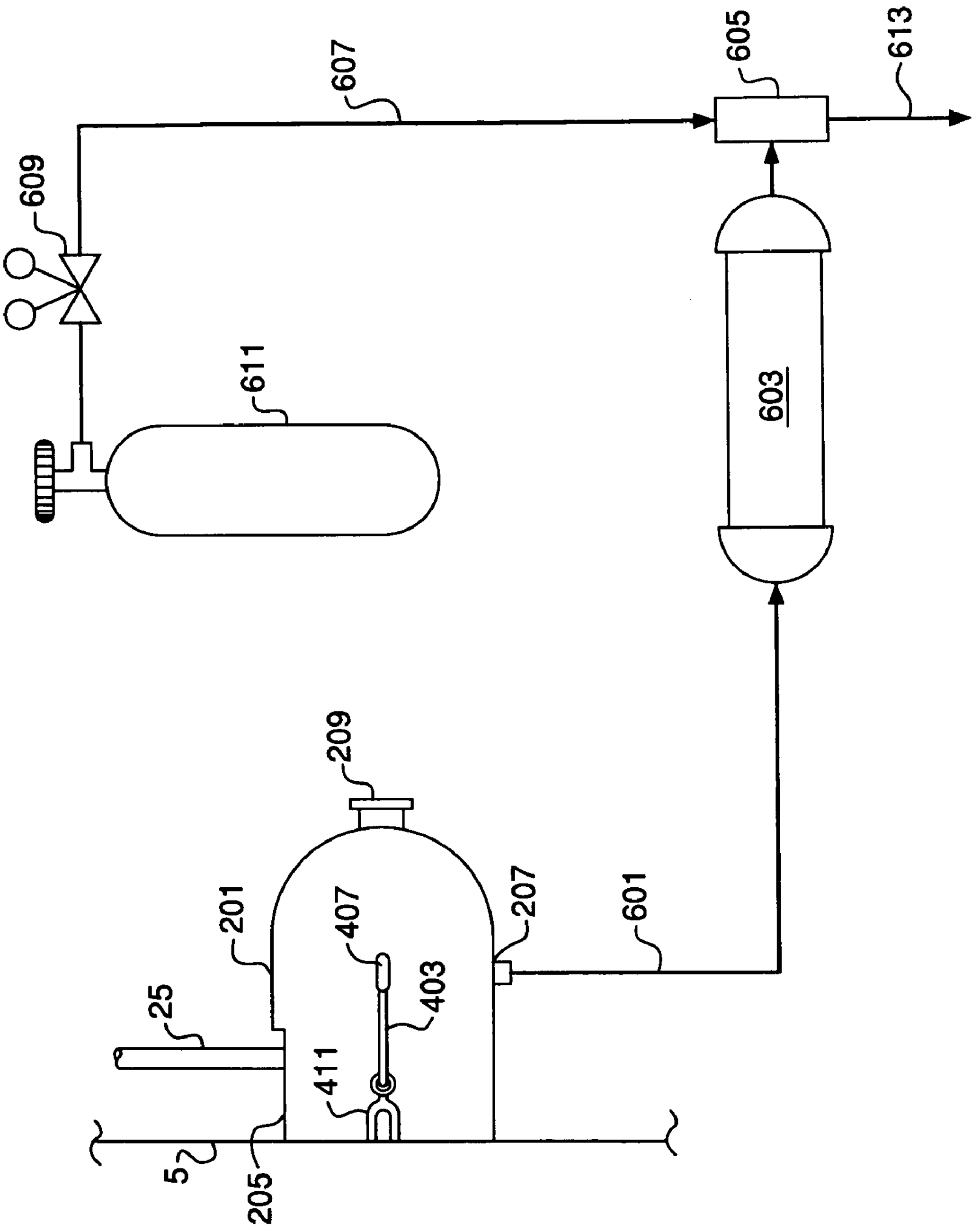
FIG. 6 is a schematic process flow diagram for an embodiment of the invention.

Leaking gas collected by containment enclosure 201 may be processed and captured by the embodiment illustrated in FIG. 6. When a leak in the fluid storage vessel assembly is detected, containment enclosure 201 is attached to bulkhead 5 by the elastic cords and magnets of FIGS. 4 and 5 (cord 403, eyebolt 407, and magnet 411 are shown here). The opening of enclosure 201 is pressed against bulkhead 5 but preferably does not form a completely gas tight seal. Slot 205 is loosely closed around tube 25 using adhesive tape or hook-and-loop fabric (not shown). Small port 207 is connected to line 601 and larger port 209 is capped as shown. Line 601 is in flow communication with the inlet of scrubbing vessel 603 containing reactive material that reacts with and captures the gas leaking from the fluid storage vessel assembly. The reactive material may undergo a chemical reaction with the leaking gas and/or adsorb and/or absorb the gas, thereby capturing and immobilizing the gas.

The outlet of scrubbing vessel 603 is connected in flow communication with the aspirated inlet of venturi eductor 605, and line 607 is connected to the high pressure motive gas inlet of the eductor. Scrubbing vessel 603 is made of any material compatible with the leaking gas to be treated therein and compatible with the temperatures that occur during reaction with the collected gas. Line 607 is in flow communication with pressure regulator 609 mounted on high pressure gas supply cylinder 611, which provides gas for flow through venturi eductor 605 to generate a low pressure at the aspirated inlet. The high pressure gas may be, for example, nitrogen, other inert gas, or compressed air. Scrubbing vessel 603 is sized to process a relatively small gas leakage rate, for example, less that about 50 sccm, for up to about 100 hours. This vessel typically has a volume of approximately 2500 cc.

The venturi eductor is operated to generate a slightly subatmospheric pressure at the aspirated inlet, thereby drawing gas from containment enclosure 201 through line 601 and scrubbing vessel 603. Because containment enclosure 201 is not completely sealed, an amount of atmospheric air enters the enclosure, thereby acting as a purge gas that mixes with the leaking reactive gas. This gas mixture is treated in scrubbing vessel 603, wherein the reactive gas is captured, and clean gas is vented to the atmosphere via line 613.

The reactive material used in scrubbing vessel 603 will depend on the reactive nature of the leaking gas and should be selected to properly react with and capture the leaking gas. The reactive material may be a caustic neutralizer such as sodium hydroxide or potassium hydroxide for capturing acid gases such as anhydrous ammonia. Other caustic reactive materials may be used as appropriate. For gases such as boron trichloride, boron trifluoride, carbonyl sulfide, hydrogen bromide, hydrogen chloride, hydrogen iodide, silicon tetrachloride, silicon tetrafluoride, trichlorosilane, and tungsten hexafluoride, an acid neutralizer such as citric acid or ascorbic acid may be used for the reactive material. Alternatively, an oxidizer such as potassium permanganate may be used. Other acidic or oxidizing materials may be used as appropriate. For fluorine or fluorine-containing gases, alumina is an appropriate reactive material. Scrubbing vessel 603 may be fabricated from a plastic material such as, for example, polyvinyl chloride (PVC). Alternatively, the scrubbing vessel may be fabricated from any appropriate metal such as carbon steel, stainless steel, or other corrosion-resistant alloys.

The containment assembly of FIG. 6 may be carried on a cylinder delivery truck or a tube trailer for immediate use when a small leak, for example less than about 50 sccm, occurs. The containment assembly of FIG. 6 also may be carried on an emergency response (ER) vehicle for transportation to a leak site.

As an alternative to the embodiment of FIG. 6, venturi eductor 605 may be installed at the inlet to scrubbing vessel 603 such that the discharge of the eductor via line 613 passes through the scrubbing vessel. In this alternative (not shown), the scrubbing vessel processes a mixture containing the reactive gas, air entering containment enclosure 201, and motive gas from venturi eductor 603. In another alternative, a vacuum pump may be used instead of the venturi eductor at either the inlet or outlet of scrubbing vessel 603.

Figure 7:
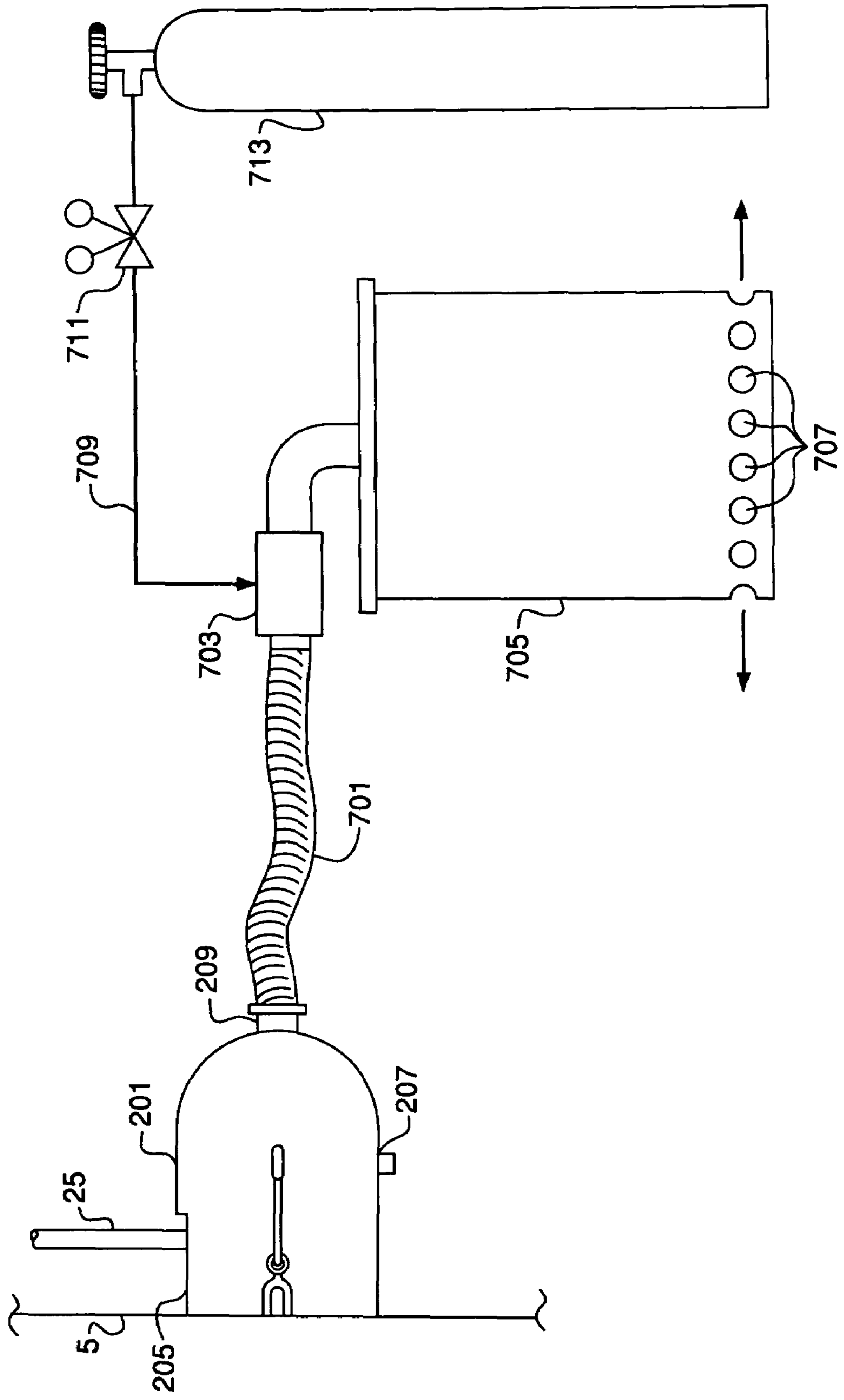
FIG. 7 is a schematic process flow diagram for an alternative embodiment of the invention.

For larger leaks (for example, greater than about 50 sccm), gas collected by containment enclosure 201 may be processed and captured by the embodiment illustrated in FIG. 7. When a leak in the fluid storage vessel assembly is detected, containment enclosure 201 is attached to bulkhead 5 as described above. The opening of enclosure 201 is pressed against bulkhead 5 but preferably does not form a completely gas tight seal. Slot 205 is loosely closed around tube 25 using adhesive tape or hook-and-loop fabric (not shown). Large port 209 is connected to flexible hose 701 and smaller port 207 is capped as shown. Hose 701 is in flow communication with the aspirated inlet of venturi eductor 703, which discharges into scrubbing drum 705 that contains a bed of reactive material that reacts with and captures the gas leaking from the fluid storage vessel assembly. The reactive material may undergo a chemical reaction with the leaking gas and/or adsorb the gas and/or absorb the gas, thereby capturing and immobilizing the gas. The bed of reactive material is contained by appropriate support screens within drum 705 so that treated gas can exit via vent holes 707 in the bottom of the drum.

The motive gas inlet of venturi eductor 705 is connected via line 709 to pressure regulator 711 mounted on high pressure gas supply cylinder 713, which provides gas for flow through venturi eductor 703 to generate a low pressure at the aspirated inlet. The high pressure gas may be, for example, nitrogen, other inert gas, or compressed air. Scrubbing drum 705 is sized to process a larger gas leakage rate, for example, greater than about 50 sccm, for an operating period of several hours up to 100 hours. This drum typically has a volume of 200 to 250 liters.

Venturi eductor 703 is operated to generate a slightly sub-atmospheric pressure at the aspirated inlet, thereby drawing gas from containment enclosure 201 through hose 701 and discharging it into scrubbing drum 705. Because containment enclosure 201 is not completely sealed, an amount of atmospheric air enters the enclosure, thereby acting as a purge gas that mixes with the leaking reactive gas. This gas mixture and the motive gas from venturi eductor 703 are treated in scrubbing drum 705, wherein the reactive gas is captured, and clean gas is vented to the atmosphere via openings 707.

The reactive material used in scrubbing drum 705 will depend on the reactive nature of the leaking gas and is selected to properly react with and capture the leaking gas. The reactive material may be a caustic neutralizer such as sodium hydroxide or potassium hydroxide for capturing acid gases such as anhydrous ammonia. Other caustic reactive materials may be used as appropriate. For gases such as boron trichloride, boron trifluoride, carbonyl sulfide, hydrogen bromide, hydrogen chloride, hydrogen iodide, silicon tetrachloride, silicon tetrafluoride, trichlorosilane, and tungsten hexafluoride, an acid neutralizer such as citric acid or ascorbic acid may be used for the reactive material. Alternatively, an oxidizer such as potassium permanganate may be used. Other acidic or oxidizing materials may be used as appropriate. For fluorine or fluorine-containing gases, alumina is an appropriate reactive material. Scrubbing drum 705 may be fabricated from a plastic material such as, for example, polyvinyl chloride (PVC). Alternatively, the scrubbing drum may be fabricated from any appropriate metal such as carbon steel, stainless steel, or other corrosion-resistant alloys.

Because of the larger size of the scrubber vessel and compressed gas cylinder of the embodiment of FIG. 7 compared with the embodiment of FIG. 6, the leak containment assembly of FIG. 7 typically is transported to a leak site by an emergency response vehicle.

EXAMPLE

An ISO-type multiple-cylinder module containing a fluorine-nitrogen mixture is offloaded from a ship at a port. An emergency response team is present during the offloading according to standard practice in order to check the module before land transport to the customer. The ER team detects a small leak of about $1\times10^{-3}$ cc/sec at the bull plug of one of the cylinders. While this leak is minor, the toxicity of fluorine and the low odor threshold of the leaking gas prohibit land transportation of the module to the customer. The leaking cylinder could be handled at the dock by the ER team by emptying the leaking cylinder and reacting the withdrawn gas with scrubbing material to immobilize the gas. However, this approach could take up to 48 hours, would have some associated risk, and would require closure of the dock area during the procedure. This could result in a significant economic penalty because of the dock area closure.

The ER team decides to handle the leak by utilizing the containment cap described above with reference to FIGS. 2-5 and the process of FIG. 6. In this case, the cylinder does not have a safety relief device and therefore does not have tee fitting 11, externally-threaded compression fitting body 23, tube 25, and compression fitting 27. Because pigtail 19 need not be removed, enclosure 201 is placed over and around fluid flow fitting 203 such that slot 205 slides over pigtail 19. Containment enclosure 201 is placed over the leaking fluid flow fitting, and magnets 409 and 411 are attached to the ISO module to hold the containment enclosure in place. Slot 205 fits over the pigtail and is partially closed off using duct tape to allow some leakage of ambient air into containment enclosure 201. Line 601 is attached to outlet 207, pressurized nitrogen flow is initiated from cylinder 611 via line 607 through venturi eductor 605, and a mixture of leaking gas and inflowing air is withdrawn from containment enclosure 201 and through scrubbing vessel 603, wherein the reactive gas is captured by alumina. Clean gas is vented to the atmosphere via line 613.

While gas withdrawal and treatment continues, the ISO container is transported by truck and followed by the ER team to a production facility with the proper equipment to handle the leak and repair the leaking cylinder. Because the ISO module is no longer at the dock, the dock area can be reopened for normal operation.

The invention claimed is:

1. A fluid storage and leak containment apparatus comprising (a) a fluid storage vessel assembly comprising at least one vessel having an interior, an exterior, and an outlet opening between the interior and the exterior;

(b) a fluid flow fitting sealably connected to the outlet opening and adjacent the exterior of the at least one vessel, wherein the fluid flow fitting is adapted for withdrawing reactive gas from the interior of the vessel;

(c) a containment enclosure having an interior, an exterior, an open end, and an extraction port adapted for the withdrawal of gas from the interior of the containment enclosure, wherein the open end is adapted to fit over and around the fluid flow fitting such that the containment enclosure surrounds the fluid flow fitting and is adapted to collect any reactive gas leaking from the fluid flow fitting; and (d) an attachment member connected to the containment enclosure, wherein the attachment member is adapted to removably attach the containment enclosure to the fluid storage vessel assembly and to cress the open end of the enclosure against the fluid storage vessel assembly around the fluid flow fitting;

wherein the removable attachment member comprises at least one elastic body having a first end and a second end, the first end is connected to the exterior of the containment enclosure and the second end has a magnet fixed to it to provide a removable magnetic attachment to the fluid storage vessel assembly such that the elastic body is in tension.

2. The apparatus of claim 1 wherein the containment enclosure is adapted to be removably attached to the fluid storage vessel assembly around the fluid flow fitting.

3. The apparatus of claim 1 wherein the at least one elastic body is selected from the group consisting of metal springs and cords made of elastomeric material.

4. The apparatus of claim 1 wherein the fluid storage vessel assembly is steel.

5. The apparatus of claim 1 comprising a gas evacuation device in flow communication with the extraction port of the containment enclosure, wherein the gas evacuation device is adapted to withdraw gas from the interior of the containment enclosure.

6. The apparatus of claim 5 wherein the gas evacuation device is selected from the group consisting of a vacuum pump and a venturi eductor driven by a pressurized gas.

7. The apparatus of claim 1 comprising a scrubbing vessel in flow communication with the gas evacuation device, wherein the scrubbing vessel contains reactive material adapted to react with and capture the reactive gas withdrawn from the containment enclosure.

8. The apparatus of claim 7 wherein the reactive material is selected from the group consisting of alumina, sodium hydroxide, potassium hydroxide, citric acid, ascorbic acid, and potassium permanganate.

9. A leak containment cap comprising (a) an enclosure having an interior, an exterior, an open end, and an extraction port adapted for the withdrawal of gas from the interior of the enclosure, wherein the open end is adapted to fit over and around a fluid flow fitting that is connected to an outlet of a fluid storage vessel of a fluid storage vessel assembly, and wherein the enclosure is adapted to surround the fluid flow fitting and contact the fluid storage vessel assembly; and (b) a removable attachment member connected to the containment enclosure, wherein the removable attachment member is adapted to removably attach the containment enclosure to the fluid storage vessel assembly and to press the open end of the enclosure against the fluid storage vessel assembly around the fluid flow fitting;

wherein the removable attachment member comprises at least one elastic body having a first end and a second end, wherein the first end is connected to the exterior of the enclosure and the second end has a magnet fixed to it to provide a removable magnetic attachment to the fluid storage vessel assembly such that the elastic body is in tension.

10. The leak containment cap of claim 9 wherein the at least one elastic body is selected from the group consisting of metal springs and cords made of elastomeric material.

11. A method for containing a leak of a reactive gas from a fluid storage vessel assembly comprising (a) providing a fluid storage vessel and leak containment apparatus including (1) a fluid storage vessel assembly including at least one fluid storage vessel having an interior, an exterior, and an outlet opening between the interior and the exterior;

(2) a fluid flow fitting sealably connected to the outlet opening and adjacent the exterior of the at least one fluid storage vessel, wherein the fluid flow fitting is adapted for withdrawing reactive gas from the interior of the vessel; and (3) a leak containment cap comprising (i) an enclosure having an interior, an exterior, an open end, and an extraction port adapted for the withdrawal of gas from the interior of the leak containment cap, wherein the open end is adapted to fit over and around a fluid flow fitting connected to an outlet of the at least one fluid storage vessel such that the enclosure can surround the fluid flow fitting and contact the fluid storage vessel assembly, and (ii) a removable attachment member connected to the enclosure, wherein the removable attachment member is adapted to removably attach the enclosure to the fluid storage vessel assembly and to press the open end of the enclosure against the fluid storage vessel assembly around the fluid flow fitting; wherein the removable attachment member comprises at least one elastic body having a first end and a second end, wherein the first end is connected to the exterior of the enclosure and the second end has a magnet fixed to it to provide a removable magnetic attachment to the fluid storage vessel assembly such that the elastic body is in tension;

(b) detecting a leak of the reactive gas from the fluid flow fitting;

(c) placing the enclosure over and around the fluid flow fitting and attaching the removable attachment member to the fluid storage vessel assembly so that the enclosure completely surrounds the fluid flow fitting; and (d) collecting in the enclosure reactive gas leaking from the fluid flow fitting, withdrawing through the extraction port the reactive gas collected in the enclosure, and reacting the reactive gas with reactive material, thereby capturing and immobilizing the reactive gas leaking from the fluid flow fitting.

12. The method of claim 11 wherein an external displacement gas enters the enclosure and mixes with the reactive gas collected from the leak in the fluid flow fitting.

13. The method of claim 12 wherein the external displacement gas is a portion of the ambient air surrounding the fluid storage vessel.

14. The method of claim 11 wherein the withdrawal of the gas through the extraction port by is effected by a gas evacuation device and the gas is reacted with the reactive material in a scrubbing vessel in flow communication with the gas evacuation device.

15. The method of claim 14 wherein the gas evacuation device either (i) withdraws the gas from the extraction port and discharges the gas into the scrubbing vessel or (ii) is installed in an outlet of the scrubbing vessel such that gas is drawn from the extraction port and through the scrubbing vessel, and the gas evacuation device withdraws gas from the scrubbing vessel.

16. The method of claim 11 wherein the reactive gas is selected from the group consisting of anhydrous ammonia, boron trichloride, boron trifluoride, carbonyl sulfide, hydrogen bromide, hydrogen chloride, hydrogen iodide, silicon tetrachloride, silicon tetrafluoride, trichlorosilane, tungsten hexafluoride, fluorine, and a mixture of fluorine and nitrogen.

17. A fluid storage and leak containment apparatus comprising (a) a fluid storage vessel assembly comprising a plurality of fluid storage vessels, each fluid storage vessel having an interior, an exterior, an outlet opening between the interior and the exterior, and a fluid flow fitting sealably connected to the outlet opening and adjacent the exterior of the fluid storage vessel, wherein the fluid flow fitting is adapted for withdrawing a reactive gas from the interior of the vessel;

(b) a leak containment cap comprising (i) an enclosure having an interior, an exterior, an open end, and an extraction port adapted for the withdrawal of gas from the interior of the enclosure, wherein the open end is adapted to fit over and around a fluid flow fitting connected to an outlet of the fluid storage vessel such that the enclosure can surround the fluid flow fitting and contact the fluid storage vessel assembly, and (ii) a removable attachment member connected to the enclosure, wherein the removable attachment member is adapted to removably attach the enclosure to the fluid storage vessel assembly and to press the open end of the enclosure against the fluid storage vessel assembly around the fluid flow fitting;

(c) a scrubbing vessel having an inlet in flow communication with the extraction port and an outlet, wherein the scrubbing vessel contains reactive material adapted to react with and capture the reactive gas withdrawn from the leak containment cap; and (d) a venturi eductor having a pressurized gas inlet, an aspirated inlet, and an outlet, wherein the aspirated inlet is in flow communication with the scrubbing vessel.

18. The apparatus of claim 17 wherein the venturi eductor either (i) withdraws the gas from the extraction port and discharges the gas into the scrubbing vessel or (ii) is installed in an outlet of the scrubbing vessel such that gas is drawn from the extraction port and through the scrubbing vessel and wherein the venturi eductor withdraws gas from the scrubbing vessel.

19. The apparatus of claim 17 wherein where the reactive material is selected from the group consisting of alumina, sodium hydroxide, potassium hydroxide, citric acid, ascorbic acid, and potassium permanganate.

20. The apparatus of claim 19 wherein the pressurized storage vessel is one of a plurality of pressurized storage vessels installed in a tube trailer.

21. A method for responding to a leak of a reactive gas from a pressurized storage vessel assembly comprising (a) providing a fluid storage and leak containment apparatus including (1) a fluid storage vessel assembly comprising at least one fluid storage vessel having an interior, an exterior, and an outlet opening between the interior and the exterior;

(2) a fluid flow fitting sealably connected to the outlet opening and adjacent the exterior of the at least one fluid storage vessel, wherein the fluid flow fitting is adapted for withdrawing reactive gas from the interior of the vessel;

(3) a leak containment cap comprising (i) an enclosure having an interior, an exterior, an open end, and an extraction port adapted for the withdrawal of gas from the interior of the enclosure, wherein the open end is adapted to fit over and around a fluid flow fitting connected to an outlet of the at least one fluid storage vessel such that the enclosure can surround the fluid flow fitting and contact the exterior of the fluid storage vessel assembly, and (ii) a removable attachment member connected to the enclosure, wherein the removable attachment member is adapted to removably attach the enclosure to the fluid storage vessel assembly and to press the open end of the enclosure against the fluid storage vessel assembly around the fluid flow fitting;

(4) a scrubbing vessel having an inlet in flow communication with the extraction port and an outlet, wherein the scrubbing vessel contains reactive material adapted to react with and capture the reactive gas withdrawn from the leak containment cap; and (5) a venturi eductor having a pressurized gas inlet, an aspirated inlet, and an outlet, wherein the aspirated inlet is in flow communication with the scrubbing vessel;

(b) detecting a leak of the reactive gas from the fluid flow fitting;

(c) placing the enclosure over and around the fluid flow fitting and attaching the removable attachment member so that the enclosure surrounds the fluid flow fitting, and collecting in the enclosure the reactive gas leaking from the fluid flow fitting;

(d) withdrawing through the extraction port a mixture of the reactive gas collected in the enclosure and ambient air drawn into the enclosure, and reacting the reactive gas with reactive material, thereby capturing and immobilizing the reactive gas leaking from the fluid flow fitting;

(e) while continuing to capture and immobilize the reactive gas from the fluid storage vessel, transporting the fluid storage vessel assembly to a repair facility; and (f) removing the reactive gas from the fluid storage vessel and replacing or repairing the fluid flow fitting.

22. The method of claim 21 wherein the fluid storage vessel is one of a plurality of fluid storage vessels installed in a tube trailer.

* * * * *

UNITED STATES PATENT AND TRADEMARK OFFICE

CERTIFICATE OF CORRECTION

PATENT NO. : 7,448,402 B2
APPLICATION NO. : 11/590029
DATED : November 11, 2008
INVENTOR(S) : Robert Lee Martrich et al.

It is certified that error appears in the above-identified patent and that said Letters Patent is hereby corrected as shown below:

Column 10, Line 52

In claim 1 delete “cress” and substitute therefor --press--

Signed and Sealed this

Seventeenth Day of February, 2009

John Doll

JOHN DOLL
*Acting Director of the United States Patent and Trademark Office*